Aug. 30, 1949.  B. F. ARPS ET AL  2,480,537
POST HOLE DIGGER ATTACHMENT FOR TRACTORS
Filed July 26, 1945  4 Sheets-Sheet 1

INVENTORS
BRUNO F. ARPS
FREDERICK B. ARPS
BY *A.S.Knob*
ATTORNEY

INVENTORS
BRUNO F. ARPS
FREDERICK B. ARPS
BY *Askrok*
ATTORNEY

Aug. 30, 1949.   B. F. ARPS ET AL   2,480,537
POST HOLE DIGGER ATTACHMENT FOR TRACTORS
Filed July 26, 1945   4 Sheets-Sheet 3
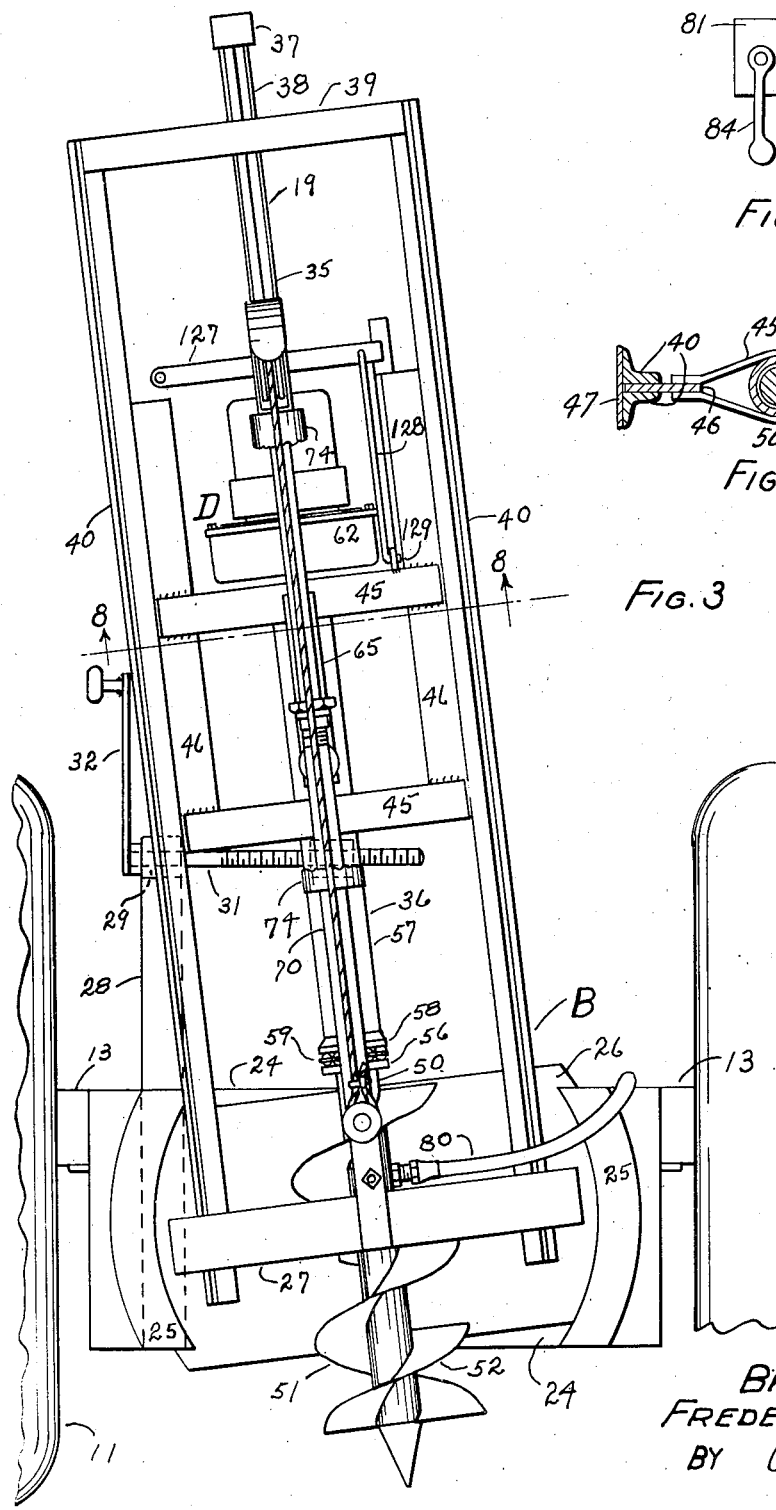
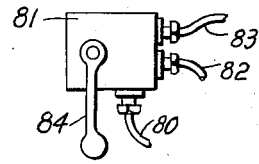
FIG. 7
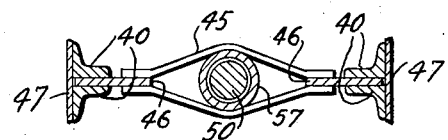
FIG. 8
FIG. 3
INVENTORS
BRUNO F. ARPS
FREDERICK B. ARPS
BY
ATTORNEY

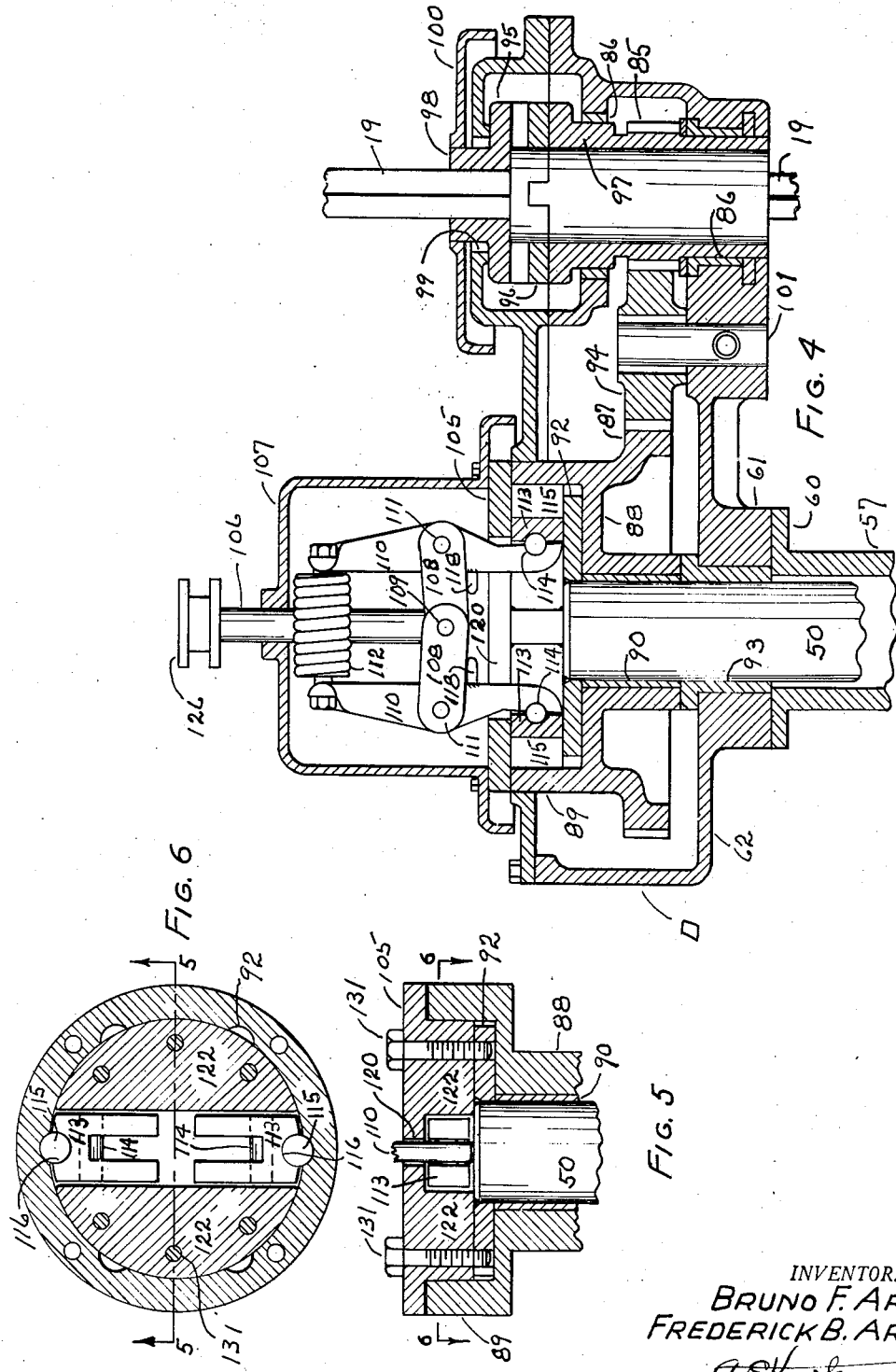

Patented Aug. 30, 1949

2,480,537

UNITED STATES PATENT OFFICE 2,480,537

POSTHOLE DIGGER ATTACHMENT FOR TRACTORS

Bruno F. Arps and Frederick B. Arps, New Holstein, Wis.

Application July 26, 1945, Serial No. 607,186

3 Claims. (Cl. 255—22)

The present invention relates to an attachment for tractors for digging post holes and being powered by the tractor engine and having preferably hydraulic means for raising and lowering the auger.

An object of the present invention is to provide a device of the character which can be operated by the tractor operator and from the seat of the tractor, having means whereby the operator can quickly and easily move the auger into exact position and control and operate the auger and tractor without assistance.

Another object of the present invention is to provide a post hole digger attachment, which can be conveniently attached and detached from the tractor.

An important object of the present invention is to provide convenient means whereby the frame of the device may be tilted on its fastening to the tractor for side hill work, or for digging holes at a transverse angle to the tractor.

A still further object of the present invention is to provide an automatic power release for the auger, thereby to disconnect its driving means when the auger meets a serious obstruction.

Power post host digging should be on a mass production basis and therefore our device was designed for this purpose, that is, the auger can be removed and located at the next position and put into operation quickly so a large number of holes can be dug per hour by a single operator and without leaving the tractor seat and without tiring the operator. Complementing these features, is a design which is simple, easily manufactured at low cost and durable.

To these and other useful ends our invention consists of parts, combinations of parts or their equivalents, and mode of operation as hereinafter described and claimed and shown in the accompanying drawings in which:

Fig. 3 is a front view of the device as shown in figure 2 except showing the device tilted for side hill work or for boring a hole in the earth at an angle transverse to the tractor.

Fig. 4 is a vertical sectional view illustrating details of the power throw-out clutch and its driving means.

Figs. 5 and 6 are detailed views of fractions of the device as shown in figure 4.

Figure 7 is a plan view of a control box mounted on the tractor within reach of the operator, and Figure 8 is a cross-sectional view taken on line 8—8 of Figure 3.

Figure 1:
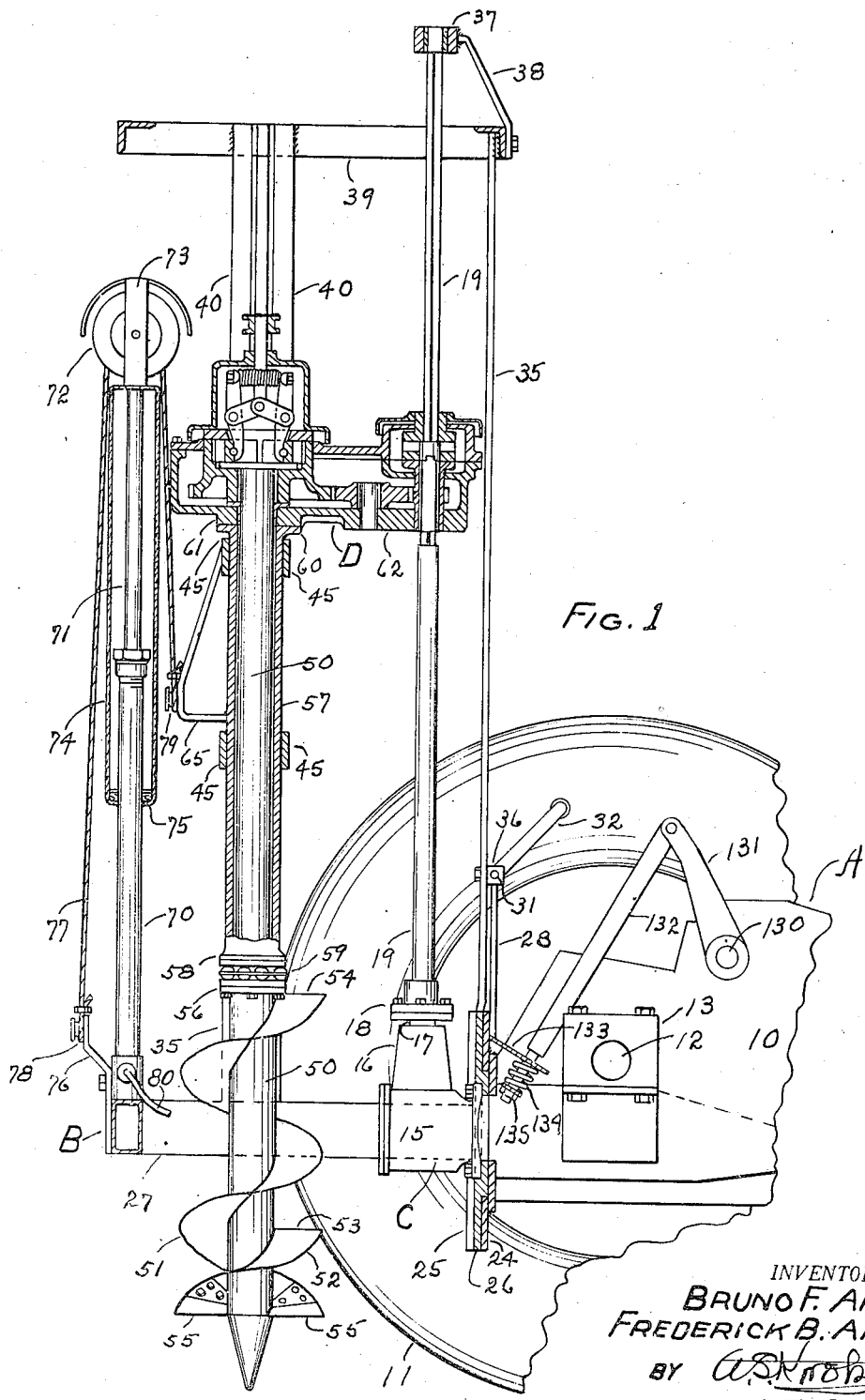
Fig. 1 is a side elevational view of our device shown attached to a fraction of a conventional tractor.

As thus illustrated the tractor is designated by reference character A, the digger attachment unit in its entirety is designated by reference character B. The tractor consists of the main frame 10 having rear driving wheels 11—11 which are mounted on the ends of axles 12—12, the axles protruding through axle housings 13—13. Secured to the rear end of member 10 is a power take-off which in its entirety is designated by reference character C, having a housing 15 which is turnably secured to member 10. Member 15 has a transverse housing projection 16, the shaft 17 protruding. When member 15 is turned so shaft 17 is positioned horizontally, a driving pulley is attached to the end thereof for belt work.

Member C is provided by the tractor manufacturer as a standard attachment and when used for driving our post hole digger it is turned to and secured in the position shown in Figure 1. A universal joint 18 is provided on the end of shaft 17 and has a shaft 19, the purpose of which will hereinafter appear.

Our device is provided with a plate 24, which is secured to the tractor and having flanges 25—25 for holding member 26 into axial alignment with member C, the flanges overlaying plate 26 as shown. These members provide means whereby the digger attachment can be easily and quickly removed or replaced. A supporting frame 27 is secured to plate 26. A post 28 is secured to plate 24 having at its upper end a collar 29 which is pivotally mounted on member 28 as at 30 (see Figure 2). A screw-threaded shaft 31 is rotatably mounted in collar 29 and held from end movement by the hub of a crank 32 and another collar 33. A post 35 is secured to member 26 having rotatably secured thereto a block 36 into which member 31 is screw-threaded.

Figure 2:
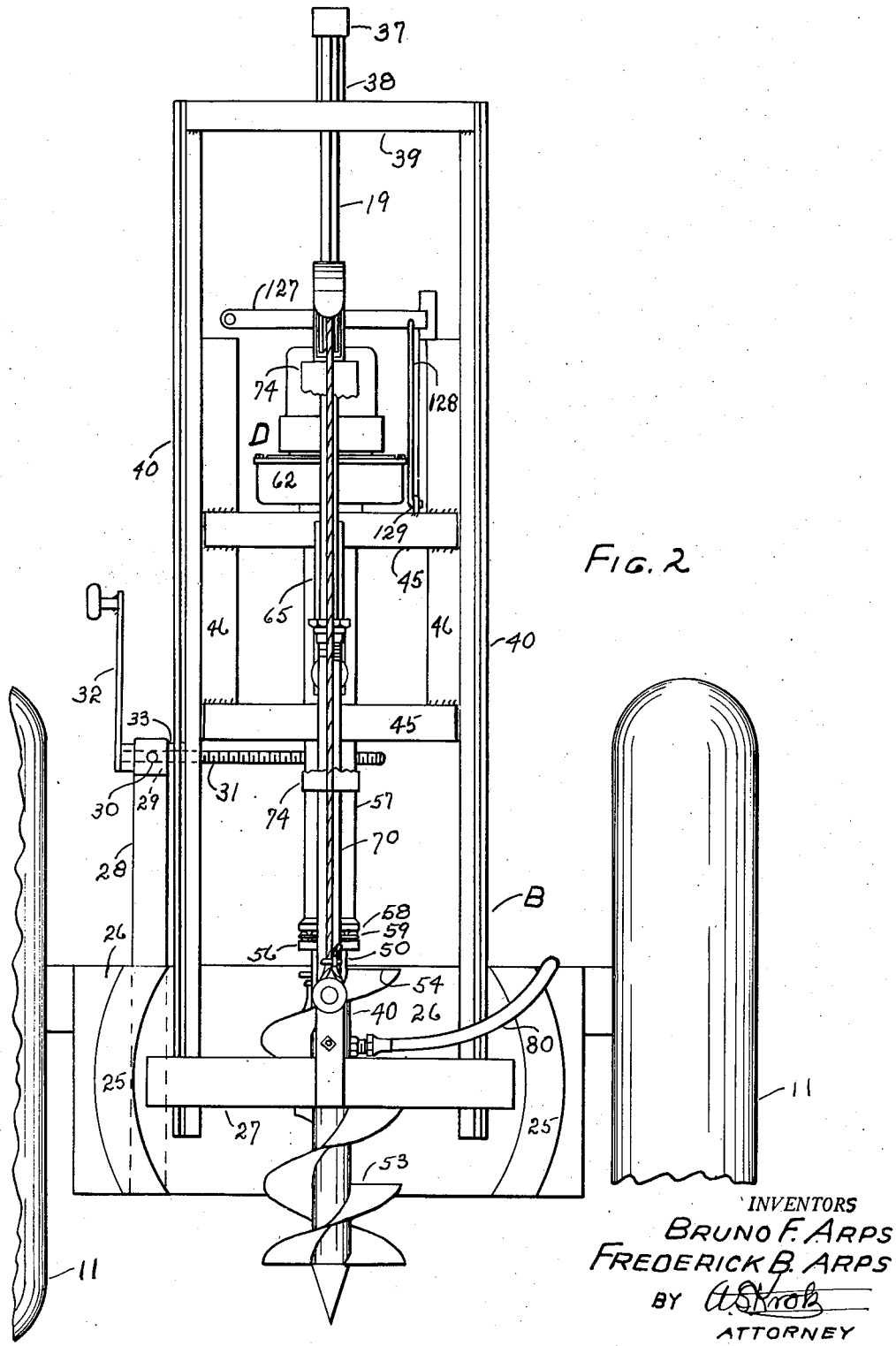
Fig. 2 is a front view of the device shown in figure 1.

Thus it will be seen that by turning crank 32, member B may be positioned and held as shown in Figure 2 or member B may be moved to the position shown in figure 3 or turned to the opposite angle as shown in this figure. Shaft 19 is rotatably mounted in bearing 37 which is secured to a bracket 38 forming an extension to member 35. A frame member 39 is secured to the upper end of member 35 to the sides of which posts 40—40 are secured, the lower ends of these posts 40 being secured to the sides of frame member 27 as illustrated in Figures 1, 2 and 3; thus members 26, 27, 35, 39 and 40 constitute the digger frame of our device which may be tilted transversely at will and which carries the upper end of shaft 19 as illustrated.

We provide spaced transverse members 45—45 which are secured to members 46—46 about as shown in Figures 2, 3 and 7. Members 40 comprise spaced angle irons between which members 46 are slidably mounted. These members are held together by means of a plate 47 as shown in Figure 8. We provide an auger digger comprising a shaft 50 having mounted on its lower end auger members 51 and 52, member 52 at its upper end terminating preferably as at 53 and member 51 at its upper end terminating as at 54. On the lower ends of members 51 and 52 we removably attach cutting blades 55—55 (see Figure 1) these blades having preferably sharpened cutting edges and being made of suitable material for the purpose.

We secure a collar 56 to shaft 50 having a wearing plate as illustrated. We provide a housing tube 57, the lower end having a collar 58 with a wearing plate as illustrated, which is spaced a short distance from the wearing plate of collar 56. Between these wearing plates we provide a ball thrust bearing 59. The upper end of member 57 is provided with a flange 60 (see Figure 1) which contacts a bearing member 61 of a housing 62, these members forming a part of the driving and releasing mechanism which in its entirety is designated by reference character D.

We provide means for raising and lowering member D and the auger as follows: Tube 57 is secured to members 45; thus members D and 57 are slidably mounted on the digger frame, so the auger may be raised and lowered. A bracket 65 is secured to tube 57.

A hydraulic cylinder 70 is secured at its lower end to frame 27 having a piston 71 on the upper end of which is rotatably mounted a V-belt pulley 72 by means of a bracket 73. A tube 74 is closed at its upper end and secured to piston 71 and bracket 73, the lower end having a stuffing box 75 which is free to move longitudinally on cylinder 70; thus tube 74 and its stuffing box 75 will act to protect piston 71 from the elements.

We secure an anchor 76 to frame member 27, see Figure 1. A wire cable 77 is anchored to member 76 as at 78; this cable extending over pulley 72, the other end being anchored to member 65 as at 79. The lower end of cylinder 70 is connected to a hydraulic supply tube 80 (see Figure 2) which has a connection at its other end to a control box (not shown) within easy reach of the operator. The control box is provided with a lever operated valve by means of which oil pressure may be supplied to cylinder 70 for raising member D and its connecting parts. Figure 7 illustrates a hydraulic valve control box 81 having a connection 80 which leads to cylinder 70 and a connection 82 which leads to a sump. Another connection 83 leads from the pressure side of a hydraulic pump. The valve in box 81 has a connection to a manually operated lever 84, the valve and ports being arranged so when the lever is moved in one direction the poston in tube 70 will be raised and when lever 84 is moved in the other direction from neutral a port will be opened between tubes 80 and 82. Thus the raising and lowering of member D will be under control of the operator. It will be understood that when lever 84 is in a neutral position piston 71 will be locked in its position. When piston 71 and pulley 72 are moved upwardly by this oil pressure. This lever control valve has a by pass whereby when the lever is in another position, oil will be permitted to flow back into the hydraulic pump supply tank because of the weight of member D, the auger and their connected parts; thus the operator can raise and lower the auger digger at will.

Attention is now called to the power lift shaft 130 which on conventional tractors protrudes through opposite sides of the tractor frame, each end of the shaft having an arm 131 which is generally connected to the draw-bars of the tractor. In the present invention one of arms 131 is connected to a link 132, the lower end of which is round and extends through a bracket 133. A spring 134 is held on the rounded end of member 132 and between member 133 and a nut 135. On power lift tractors of the class when arms 131 reach maximum raised position, the oil supply to the ram is shut off. The object of spring 134 is to normally hold levers 131 to a position which is before this shut off operation takes place, the pressure on the ram acting at all times to overcome the pull of spring 134. The spring is designed to determine maximum pressure desired in the hydraulic system so that it will act to prevent excessive pressure in the system; thus the hydraulic pressure is available at all time for operating the digger but prevented from raising above a predetermined pressure.

It will also be understood that the valve is adapted to control the speed of movement of piston 71. Furthermore if desired a restricted opening on the discharge side of the valve may be provided whereby when the valve is moved for lowering shaft 50 the speed of movement is determined, thus preventing overloading the device. Generally however the speed of movement of the auger may be determined by the operator in his manipulation of the valve lever.

We provide driving means for the auger as follows: It is anticipated that member D, housing 57, shaft 50 and the auger will supply weight enough to force cutter blades 55 into the earth, the speed at which these cutter blades enter the earth being at all times under control of the operator as hereinbefore described.

The power connection from shaft 19 to shaft 50 is as follows: A pinion 85 is rotatably mounted in housing 62 as illustrated in Figure 4. A gear 87 is made fast to a hub member 88 and having an annular extension 89. Member 88 is rotatably mounted on shaft 50 by means of bearing member 90 and shaft 50 is rotatably mounted in bearing 93. Member 89 has on its inner surface preferably six depressions 92. Pinion 85 and gear 87 are operatively connected by means of an intermediate gear 94, which is rotatably mounted on stud 101 which is anchored to housing 62 as illustrated. It will be seen that the axes of pinion 85 and gear 87 are fixed on housing 62 by bearings 86 and 93.

Shaft 19 can not easily be held on a fixed axis, I therefore provide means for driving pinion 85 by this shaft as follows: Shaft 19 is preferably square in cross-section and a driving member 95 is provided with a square opening, which fits snugly over the shaft but being loose enough to slide freely in response to the movement of housing 62. Member 95 is operatively connected to member 85 by means of a suitable flexible joint 96 and a hub 97; thus shaft 19 may act as a driver which need not be held concentric with pinion 85. It will be noted that member 95 is provided with a hub 98 which extends through an enlarged opening 99 in housing 62 thus member 19 is free to gyrate to a limited extent. A cap 100 having downwardly extending flanges is carried by hub 98 as shown, which answers to prevent rain and foreign matters from finding its way into the housing.

We provide a releasable connection from member 89 and shaft 50 as follows: A cap 105 is secured to member 89. We provide a shaft 106 which is slidably mounted in a cap 107 which is secured to member 105 and having downwardly extending flanges to prevent rain and foreign matter getting into housing 62. On the lower end of shaft 106 two pairs of links 108—108 are pivoted as at 109, the outer ends of these links being pivoted to links 110—110 as at 111—111. The upper ends of links 110 are pulled toward each other by means of a pair of springs 112 (one not shown). A pair of blocks 113—113 are provided with projections or rollers 114—114 which are engaged by the lower ends of members 110 as illustrated.

A pair of rollers 115 are fitted into grooves 116 in blocks 113, these rollers being forced into grooves 92 by means of springs 112 when links 108 are in the position shown in Figure 4. Cap 105 is slotted as at 120 for the sliding reception of the lower ends of members 110. This position is dependent upon pin 109 being slightly below the plane of pivots 111 and being held in this position by projections 118 which are secured to members 110.

It will be seen that if shaft 106 is raised so pivot 109 is above the plane of pivots 111, rollers 115 will be permitted to move inwardly out of pockets 92, thus to disengage the clutch.

Cap 105 has spaced downwardly projecting members 122—122, the inner edges of which slidably contact the opposite sides of members 113. Cap 105 and members 122 are secured to plate 92 by means of cap screws 121; thus it will be seen that member 59 will be turned by pinion 85 when the clutch parts are in the position shown in Figure 4, and this shaft 50 will not be turned when the clutch is in the position shown in Figure 1.

When the digging auger meets a serious obstruction members 113 will be forced together by the action of pockets 92 on rollers 115 and when they are forced together because of projections 118, links 108 will be moved upwardly to the position shown in Figure 1. The clutch will then remain out of engagement until the free end of lever 127 is pulled down manually, thus moving shaft 106 downwardly thus reengaging the clutch. The clutch will then be held in engagement by spring 112 until it is again disengaged as already described.

In Figure 1, we illustrate the clutch as having been released either manually or by the digger meeting a serious obstruction. On the upper end of shaft 106 we preferably provide a flange collar 126. A lever 127 is provided with a forked connection (not shown) adapted to fit between the flanges of member 126, one end being anchored to member 45 by means of a link 128 as at 129. A rope or cable may be attached to the free end of lever 127 and extend to within easy reach of the operator, whereby if the clutch has been disengaged a pull on the rope will reengage the clutch or move it to the position shown in Figure 4.

It will be understood that the releasable means associated with the operating connection between the driver and digger shaft may either definitely be disconnected as shown and described, requiring the operator to reconnect it or an overload slipping clutch may be provided which is too well known to require illustration or description.

Having thus shown and described our invention, we claim:

1. A tractor having a main frame and a power take-off shaft in combination with a post hole digger comprising an elongated generally vertically arranged digger frame securely connected at its lower end to the tractor, a driver shaft rotatably mounted at its top to the top of said digger frame and having an operating connection at its bottom to said power take-off shaft, a digger transmission longitudinally slidably mounted in said digger frame, said transmission having a longitudinally movable operating connection to said driver shaft for continuously rotating the driver shaft, a tube forming a part of said digger transmission and extending downwardly therefrom, a digger shaft rotatably mounted in said tube and having an operating connection at its upper end to said transmission with its lower end protruding from the lower end of said tube, the tube forming a guide bearing for said digger shaft, an auger digger mounted on the protruding end of said digger shaft, separate manually controlled means adapted to move said digger transmission vertically in either direction, whereby the auger may be caused to move vertically, either independently of or simultaneously with its turning movement.

2. A device as recited in claim 1, wherein the connection between the digger frame and tractor is manually adjustable for angling the frame transversely and substantially on the axis of said tractor power take-off shaft.

3. A device as recited in claim 1 wherein, said digger frame comprising pairs of angle bars positioned on opposite sides thereof, their inner flanges being spaced apart and turned inwardly, their other flanges being secured together by means of plates forming inwardly turned channels for substantially the length of the angle bars, said slidable mounting comprising elongated flat plates having their outer edges slidably mounted in said channels, pairs of vertically spaced transversely arranged bars secured at their centers to opposite sides of said tube with the ends of said bars secured to said flat plates, whereby said digger transmission is firmly and slidably held in operating position for its full vertical movement.

BRUNO F. ARPS.
FREDERICK B. ARPS.

REFERENCES CITED

The following references are of record in the file of this patent:

UNITED STATES PATENTS

| Number | Name | Date |
| --- | --- | --- |
| 1,319,259 | Adams | Oct. 21, 1919 |
| 1,507,776 | Humiston | Sept. 6, 1924 |
| 1,583,855 | Reynolds | May 11, 1926 |
| 2,320,775 | Garner | June 1, 1943 |
| 2,321,680 | Houston | June 15, 1943 |